(12) United States Patent
Krause et al.

(10) Patent No.: US 9,802,832 B2
(45) Date of Patent: Oct. 31, 2017

(54) PROCESS AND APPARATUS FOR OBTAINING MATERIAL OF VALUE FROM A BAUXITE RESIDUE

(71) Applicant: KRSYS GMBH, Neubiberg (DE)

(72) Inventors: Eberhard Krause, Eschbach (DE); Horst Schmidt-Bischoffshausen, Neubiberg bei Munchen (DE)

(73) Assignee: KRSYS GmbH (DE)

( * ) Notice: Subject to any disclaimer, the term of this patent is extended or adjusted under 35 U.S.C. 154(b) by 73 days.

(21) Appl. No.: 14/391,673

(22) PCT Filed: Apr. 10, 2013

(86) PCT No.: PCT/EP2013/057493
§ 371 (c)(1),
(2) Date: Oct. 9, 2014

(87) PCT Pub. No.: WO2013/153115
PCT Pub. Date: Oct. 17, 2013

(65) Prior Publication Data
US 2015/0360966 A1    Dec. 17, 2015

(30) Foreign Application Priority Data
Apr. 12, 2012  (WO) ............... PCT/EP2012/056696

(51) Int. Cl.
*C01F 7/00*  (2006.01)
*C01F 7/06*  (2006.01)
*B01J 19/24*  (2006.01)
*C01G 49/02*  (2006.01)

(52) U.S. Cl.
CPC .............. *C01F 7/066* (2013.01); *B01J 19/24* (2013.01); *C01G 49/02* (2013.01); *B01J 2219/00177* (2013.01); *B01J 2219/24* (2013.01)

(58) Field of Classification Search
CPC ................................. C01F 7/066; B01J 19/24
USPC .......................................................... 423/138
See application file for complete search history.

(56) References Cited

U.S. PATENT DOCUMENTS

6,248,302 B1    6/2001  Barnett et al.

FOREIGN PATENT DOCUMENTS

| CN | 101434449 | * | 5/2009 |
| EP | 2361681 A1 | | 8/2011 |
| RU | 2254170 C2 | | 6/2005 |
| RU | 2434808 C2 | | 11/2011 |
| WO | 2008-144838 | * | 12/2008 |

OTHER PUBLICATIONS

Translation of CN 101434449, May 2009.*
Piga, L., et al., "Recovering Metals from Red Mud Generated During Alumina Production", JOM Springer New York, LLC, United States, Bd. 45, Nr 11, Nov. 1, 1993.
Office action for Chinese Patent Application No. 201380030647.2 dated Dec. 3, 2015.
Office Action for Chinese Patent Application No. 2013800030647.2 dated Aug. 12, 2016.

* cited by examiner

*Primary Examiner* — Steven Bos
(74) *Attorney, Agent, or Firm* — Tarolli, Sundheim, Covell & Tummino LLP

(57) ABSTRACT

The invention relates to a process for obtaining material of value from a bauxite residue which is obtainable or has been obtained by the Bayer process. This process comprises the steps of a) providing an aqueous suspension of the bauxite residue, b) setting a pH of the suspension to a value between 7.2 and 12.2, c) at least partly deagglomerating suspended mineral agglomerates of the bauxite residue, and d) separating the resulting mixture into an iron-rich fraction and into at least one further, preferably silicate-rich fraction. The invention further relates to an apparatus (10) for carrying out the process.

22 Claims, 1 Drawing Sheet

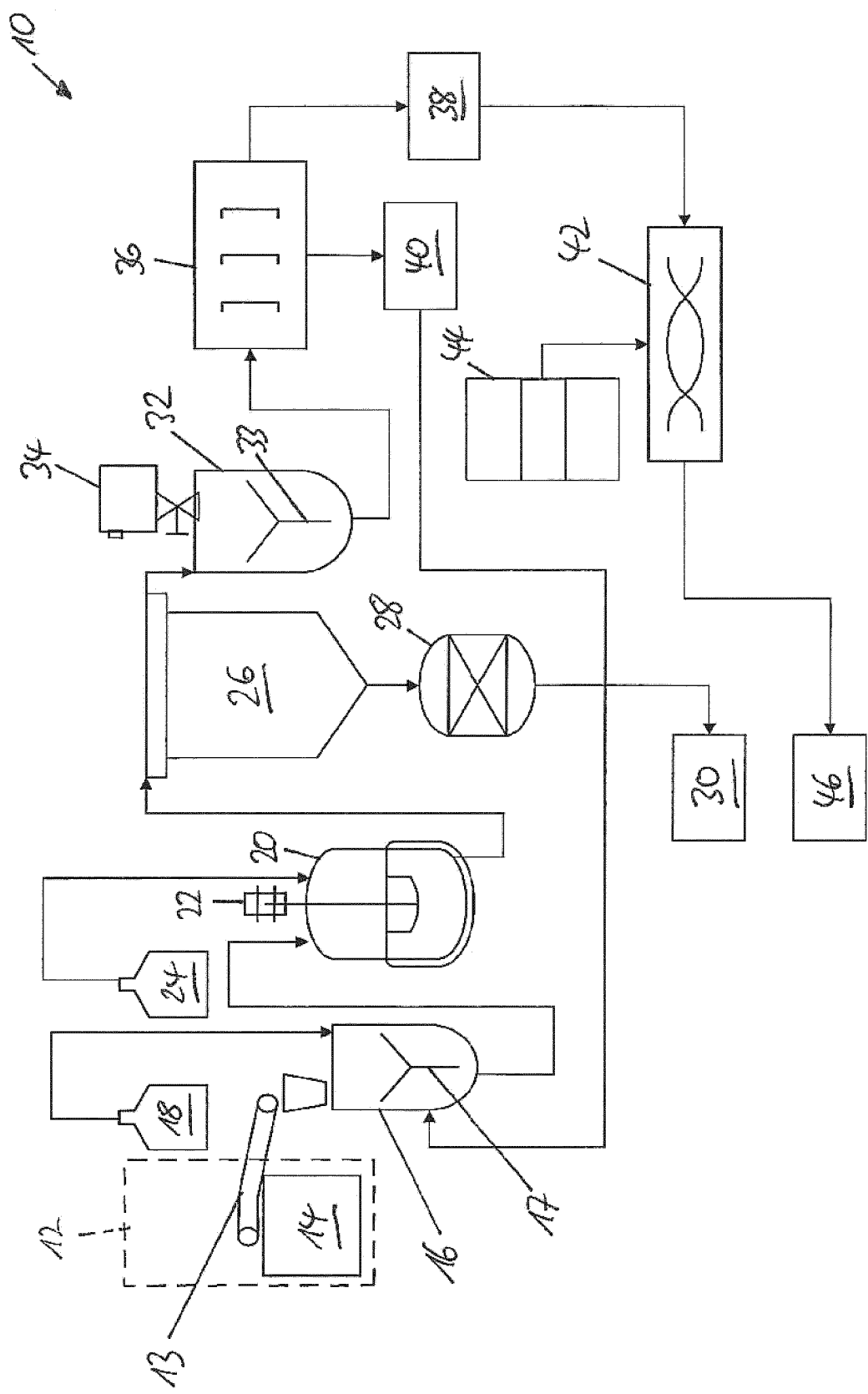

PROCESS AND APPARATUS FOR OBTAINING MATERIAL OF VALUE FROM A BAUXITE RESIDUE

The invention relates to a process for obtaining material of value from a bauxite residue obtainable by the Bayer process. Furthermore, the invention relates to an apparatus for performing the process.

In the alumina production (precursor for the aluminum melting plant) with the aid of the Bayer process, aluminum is dissolved out of finely milled bauxite as sodium aluminate with the aid of caustic soda lye. After seeding with crystallization nuclei, pure $Al(OH)_3$ (gibbsite) is precipitated from the sodium aluminate solution separated from the bauxite residue, subsequently calcinated to aluminum oxide, and finally metallic aluminum is obtained by electrolysis. The remaining bauxite residue, which is also referred to as "bauxite residue" (BR), is chemically considered mainly composed of iron oxides and hydroxides, respectively, titanium oxides, aluminum oxide residues, silicates, calcium oxide, sodium oxide and residual caustic soda lye. Due to its red color caused by iron (III) oxide, this bauxite residue is also referred to as "red mud".

According to the quality of the used bauxite, 1 to 3 tons of bauxite residue arise to each produced ton of aluminum as a non-avoidable attendant. Therefore, many millions of tons of bauxite residue arise each year, which present a serious environmental and disposal problem together with the already present amounts. The main problem is the high alkalinity of the bauxite residue with pH values of 13 to 14 due to its content of caustic soda lye. Moreover, toxically acting aluminum ions together with iron compounds present a great danger to the ground water and additionally impede environmentally compatible disposal.

Therefore, the disposal of the bauxite residue is substantially effected by storage in sealed disposal sites. The caustic soda lye exiting on the floor of the disposal site is collected and returned into the Bayer process in some disposal sites. Usually, however, the caustic soda lye is simply sucked off and disposed of as wastewater or even leaks in uncontrolled manner in the worst cases. However, this form of storage is costly and expensive since large disposal site areas and plants are required, and high costs arise for the transport of the bauxite residue. Additionally, the long-term costs arising by the deposition can only hardly be calculated and present an additional economical problem because at least in Europe accruals for later disposal have to be constituted. At present, disposal site stocks with about 2.5 billions of tons of bauxite residue exist. To this, about 80-120 millions of tons of bauxite residue are added per year.

The disposal costs could be reduced if the bauxite residue considered as waste product heretofore could be converted to usable materials of value or be used for obtaining materials of value. In particular, the separation of the iron components is of great interest. The aim of each process should be that the obtained materials of value can be further used or marketed without expensive post-processing.

Since the beginning of the industrial employment of the Bayer process, attempts to extract the valuable ingredients such as iron, titanium, vanadium or rare earths from the bauxite residue and provide them to a new use were not lacking. However, the bauxite residue is still mainly deposited in large settling pools as a mud or piled up in chamber filter presses in a kind of pile (heap) after partial drainage, which is known as so-called "dry stacking".

However, a process for separating the high-class iron ore with a simple wet-chemical process is not known heretofore. However, since iron oxides and hydroxides can constitute more than 50% of the minerals present in the bauxite residue, a wet-chemical extraction of the iron containing compounds is of great interest.

The invention is based on the object to provide a process, which allows the wet-chemical separation of at least a part of the iron containing components in the bauxite residue as materials of value. A further object of the invention is to provide an apparatus for performing such a process.

According to the invention, the objects are solved by a process according to claim 1, for obtaining materials of value from a bauxite residue as well as by an apparatus. Advantageous configurations with convenient developments of the invention are specified in the dependent claims, wherein advantageous configurations of the process are to be considered as advantageous configurations of the apparatus.

A first aspect of the invention relates to a process for obtaining materials of value from a bauxite residue from the Bayer process. According to the invention, therein, the wet-chemical separation of at least a part of the iron containing components of the bauxite residue is allowed in that the process includes at least the steps of a) providing an aqueous suspension of the bauxite residue, b) adjusting a pH value of the suspension to a value between 7.2 and 12.2, c) at least partially disagglomerating suspended mineral agglomerates of the bauxite residue, wherein the mineral agglomerates in step c) are disagglomerated by generation of cavitation, and d) separating the resulting mixture into an iron-rich fraction and into at least one further, preferably silicate-rich fraction. Alternatively, it can be provided that the process is exclusively composed of these steps. Bauxite residue (or red mud) has a high portion of very small particles with diameters between about 20 nm and 1000 nm and therefore exhibits characteristics of a colloid, Colloids are complex systems, in which various agglomerated particles are suspended/dispersed in a liquid, namely aqueous caustic soda lye, as in the case of the bauxite residue. Electrostatic and steric bonding forces act between the particles, which normally prevent simple separation of the individual mineral particles or mineral fractions from each other and moreover also influence the chemical reactivity of the particles. In addition, bauxite residue contains zeolites in the higher percent range, which function as ion exchangers and for example prevent the simple elution of the residual caustic soda lye from the Bayer extraction. Characteristically, a bauxite residue suspension behaves like a non-Newton liquid and exhibits thixotropic behavior. The agglomeration of various mineral particles such as for example of silicate components and iron minerals prevents simple separation by gravity or with the aid of magnetic fields, as is known, because the nanoscale iron particles are fixedly connected to the other mineral components via mechanic, ionic and electrostatic forces. Ideally, a simple separation would require spherical particles to be able to realize corresponding repulsive forces. However, there are virtually no spherical particles in the bauxite residue since silicates are usually platelet-shaped formed and the other mineral components have chaotic shapes without regular geometries. Thereby, the access of surface-changing chemicals is additionally impeded. Additionally, the electrostatic forces can be differently strong according to particle geometry and composition. Clay particles are negatively charged in almost all cases.

Therefore, a separation of mineral components from such a suspension requires first cancellation of the bonding forces between the agglomerated mineral components, that is disagglomeration. Furthermore, it has to be ensured that the disagglomerated colloidal particles of a certain mineral do not again reagglomerate with different particles in undesired manner, whereby the initial state would finally again occur. On the other hand, chemically identically or similarly composed mineral particles are to conglomerate in order that larger, non-colloidal agglomerates form, which can then be separated in simple manner as an enriched fraction containing material of value.

The process according to the invention is based on the realization that for technically simple, scalable and wet-chemical separation of at least a part of the iron containing mineral phases in the bauxite residue, these specific colloidal characteristics of the bauxite residue have to be taken into account. Surface charges of particles can inherently be positive or negative. The interactions of the particles additionally depend on the ionic strength of the suspension. The invention advantageously exploits the fact that the surface charges of the mineral particles of a BR suspension can be varied depending on pH.

Therein, each mineral species has a balanced surface charge for a certain pH value, that is that the positive and negative charges compensate each other and the particle overall is electrically neutral. The corresponding pH value can therefore also be referred to as an isoelectric point or as a point of zero charge (PZC). In order to separate the iron compounds of the BR from the remaining mineral components as quantitatively as possible, their present surface charge has therefore first to be neutralized or even inverted to the opposite. Therefore, in step b) of the process according to the invention, adjustment of the pH value of the bauxite residue suspension to a value between 7.2 and 11.4 is first effected. By a pH value between 7.2 and 12.2, within the scope of the invention, pH values of 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8. 10.9, 11.0, 11.1, 11.2, 11.3, 11.4, 11.5, 11.6, 11.7, 11.8, 11.9, 12.0, 12.1 and 12.2 as well as corresponding intermediate values such as for example 9.40, 9.41, 9.42, 9.43, 9.44, 9.45, 9.46, 9.47, 9.48, 9.49, 9.50 etc. are to be understood. Hereby, the surface charges of iron containing particles in the provided bauxite residue suspension can be adjusted such that a disagglomeration of the mineral agglomerates becomes possible at all. With pH values above 12.2 or below 7.2, the particles cannot be disagglomerated anymore, but remain in suspension or agglutinate to even larger aggregates. After adjusting the pH value to a value in the range of the "point of zero charge", that is after changing the surface charge in particular of the iron-rich mineral components, in the following step c), an at least partial disagglomeration of the suspended mineral agglomerates of the bauxite residue is accordingly performed and the resulting mixture is finally separated into an iron-rich fraction and into at least one further fraction in step d). The further fraction is preferably a silicate-rich fraction. Therein, the step of disagglomerating basically is not restricted to a certain method.

The mineral agglomerates in step c) are disagglomerated by generation of cavitation. Within the scope of the invention, the formation and dissolution of steam-filled cavities (steam bubbles) in the suspending agent of the bauxite residue is to be understood by cavitation. In the cavitation, one basically differentiates two limit cases, between which there are fluent passage forms. In the steam cavitation (hard or transient) cavitation, the formed cavities contain steam of the surrounding water. Such cavities collapse under effect of the external pressure by bubble implosion (microscopic steam impact). In the soft (stabile) cavitation, gases dissolved in the liquid enter the formed cavities and attenuate or prevent the collapse thereof. In cooperation with the adjusted pH value or the modified surface charge of the individual particles, thus, particles adhering to each other can be disagglomerated by virtually "shooting" water, water steam or other gases between the particles by effect of the cavitation forces.

However, the performance employing special fast rotating stirrers, also called dissolvers, ultrasonic generators or other suitable cavitation generating means is advantageous. In all cases, the disagglomeration is based on the generation of cavitation in the suspension, which effects separation of the particles by applying mechanical forces to the particles. Furthermore, the invention advantageously exploits the comparatively great density difference between the iron-rich and the other mineral components of the BR. Iron oxides and hydroxides for example have densities $>5$ $g/cm^3$, while silicates and titanium compounds have densities of 2.6 $g/cm^3$ or less. This results in the disagglomerated iron containing particles being able to be separated at least predominantly from the not iron containing particles and being able to reagglomerate with other iron containing particles. The iron-rich fraction formed hereby therefore sinks to the bottom and separates by gravity alone from at least one further fraction, which accordingly is poor in iron and silicate-rich, respectively, and remains suspended or dispersed in the aqueous medium. Therefore, the iron-rich fraction can be separated from the further fraction in particularly simple manner as a material of value. By the separation, thus, iron ore capable of smelting with an iron content of up to 55% or more is obtained as a first material of value. This is particularly advantageous since the specification of the ironworks industry for accepting iron containing starting products is at about 50% to 55% iron content. The actual iron ore yield inherently fluctuates within certain limits depending on the specific composition of the bauxite residue, but is regularly at least 45% or more of the overall dry matter of the employed bauxite residue even with bauxite residues from old landfills. Within the scope of the invention, percent specifications are basically to be understood as mass percent unless otherwise stated. As an additional material of value or additional mixture of materials of value, the further fraction is obtained, which includes a silicate material (that is mixture of various clays), which can for example be directly employed as a fertilizer or soil conditioner or be further processed. Thus, at least two different materials of value arise from reconditioning the bauxite residue. The process according to the invention is technically particularly simply practicable and additionally simply scalable. Therefore, the process according to the invention can for example be performed immediately subsequent to the Bayer process by passing or introducing the arising bauxite residue into a corresponding apparatus for performing the process according to the invention.

In an advantageous development of the invention, it is provided that in step a), a ratio of solid to liquid between 1:2 and 1:5, in particular a ratio of 1:2.5 is adjusted in the suspension and/or that in step a) a bauxite residue with a water content between 20% and 40% is used, wherein the bauxite residue is preferably one or multiple times washed. By a ratio of solid to liquid between 1:2 and 1:5, in particular ratios of 1:2.0, 1:2.1, 1:2.2, 1:2.3, 1:2.4, 1:2.5, 1:2.6, 1:2.7, 1:2.8, 1:2.9, 1:3.0, 1:3.1, 1:3.2, 1:3.3, 1:3.4, 1:3.5, 1:3.6, 1:3.7, 1:3.8, 1:3.9, 1:4.0, 1:4.1, 1:4.2, 1:4.3, 1:4.4, 1:4.5, 1:4.6, 1:4.7, 1:4.8, 1:4.9 and 1:5.0 as well as corresponding intermediate values are to be understood. The mentioned ratio range allows good manageability of the bauxite residue on the one hand and prevents unnecessarily large amounts of liquid having to be handled in step d) on the other hand. Therein, a ratio of 1:2.5 has proven particularly advantageous. By the bauxite residue having a water content between 20% and 40%, that is in particular water contents of 20%, 21%, 22%, 23%, 24%, 25%, 26%, 27%, 28%, 29%, 30%, 31%, 32%, 33%, 34%, 35%, 36%, 37%, 38%, 39% or 40%, the amount of water to be added in step a) can be advantageously reduced. Moreover, the bauxite residue obtained by the Bayer process usually already has water contents of 28-35% and thus can be directly used. By the bauxite residue being one or multiple times washed, in particular caustic soda lye can be recovered for the Bayer process and the pH value of the bauxite residue can be adjusted as required. Alternatively or additionally, it can be provided that a density of the suspension is adjusted to a value between 1.05 $g/cm^3$ and 1.35 $g/cm^3$, in particular between 1.07 $g/cm^3$ and 1.30 $g/cm^3$. By a value between 1.05 $g/cm^3$ and 1.35 $g/cm^3$, within the scope of the invention, in particular density values of 1.05 $g/cm^3$, 1.06 $g/cm^3$, 1.07 $g/cm^3$, 1.08 $g/cm^3$, 1.09 $g/cm^3$, 1.10 $g/cm^3$, 1.11 $g/cm^3$, 1.12 $g/cm^3$, 1.13 $g/cm^3$, 1.14 $g/cm^3$, 1.15 $g/cm^3$, 1.16 $g/cm^3$, 1.17 $g/cm^3$, 1.18 $g/cm^3$, 1.19 $g/cm^3$, 1.20 $g/cm^3$, 1.21 $g/cm^3$, 1.22 $g/cm^3$, 1.23 $g/cm^3$, 1.24 $g/cm^3$, 1.25 $g/cm^3$, 1.26 $g/cm^3$, 1.27 $g/cm^3$, 1.28 $g/cm^3$, 1.29 $g/cm^3$, 1.30 $g/cm^3$, 1.31 $g/cm^3$, 1.32 $g/cm^3$, 1.33 $g/cm^3$, 1.34 $g/cm^3$ or 1.35 $g/cm^3$ as well as corresponding intermediate values are to be understood. By the density of the suspension being adjusted to a value in the mentioned range before and/or during step c), a particularly fast and complete disagglomeration is allowed.

Further advantages arise by the temperature of the suspension being adjusted to a value between 30° C. and 70° C. before step c), in particular in step a). Hereby, the reaction times for the subsequent disagglomeration can be advantageously adjusted. By a temperature between 30° C. and 70° C., in particular temperatures of 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C. or 70° C. are to be understood. For example, the time required for step c) is usually about 20 minutes at a temperature of 40° C., while it can be decreased to 15 minutes or less at temperatures above 50° C. Moreover, a bauxite residue directly obtained from the Bayer process can already have a temperature of about 70° C. and therefore can be directly further processed within the scope of the present process. At temperatures above 70° C., the compositions of several hydrate compounds among the minerals of the bauxite residue change, whereby the disagglomeration is severely impeded or even made impossible. Therein, it can basically be provided that the temperature is one or multiple times varied in the specified range.

In further development of the invention, a particularly high iron yield is achieved in that the pH value is adjusted in step b) to a value between 7.4 and 11.4, in particular between 8.4 and 11.4. In the range of values between 7.2 and 11.4, the surface charges of particularly many particles from different iron compounds can be advantageously influenced. In further development of the invention it is provided that the pH value adjusted in step b) is continuously and/or gradually varied in the range between 7.2 and 12.2 during step By the pH value being continuously and/or gradually varied, alternatively or additionally, the isoelectric points of various iron compounds can be specifically "approached" or "passed", whereby the yield of iron containing compounds can also advantageously be increased. Alternatively or additionally, the steps b) and c) can also be repeated two or multiple times.

Further advantages arise by the pH value being adjusted by addition of an acid, in particular a mineral acid, an organic acid, an acidic wastewater, an acidic condensate and/or $FeCl_2$. In further development of the invention it is provided that the pH value is adjusted by addition of a base, in particular of caustic soda lye and/or an alkaline wastewater. In further development of the invention it is provided that the pH value is adjusted by addition of a hydrolyzable compound, in particular an oil and/or a fat. Besides the adjustment of the pH value, which is a requirement for the disagglomeration, hereby, various further advantages can be achieved. For example, acidic or alkaline wastewaters, condensates and the like can be advantageously productively used for pH value adjustment as well as optionally for adjusting the solid/water ratio. Moreover, by the choice of the corresponding acid or base, influence can be exerted to the disagglomeration and to the reagglomeration of the particles and thereby to the yield of iron-rich fraction. For example, the inexpensively available compounds acetic acid and citric acid have proven to particularly increase the yield. By the use of a hydrolyzable compound, for example a plant oil or fat, besides a pH value adjustment, dispersants can additionally be formed in situ (by saponification of fatty acids), which can contribute to the miscibility and stabilization of the disagglomerated particles.

In a further advantageous development of the invention, it is provided that at least one calcium compound, in particular calcium oxide and/or calcium hydroxide and/or calcium sulfate, and/or at least one dispersant, in particular a surfactant, is added to the suspension before step c). By addition of a calcium compound, the buffer effect of the ion exchanging zeolite minerals of the bauxite residue can be advantageously repressed and the processability of the suspension as well as the yield of iron-rich compounds can be correspondingly improved. The Ca ions introduced into the suspension by the addition of the calcium compound(s) are incorporated in zeolites or zeolite containing compounds of the bauxite residue. These zeolites or zeolite containing compounds are predominantly sodium aluminum silicates, which have been formed during the bauxite extraction. By bonding the Ca ions in the zeolites, the ion exchange capabilities thereof are reduced, which in turn facilitates the adjustment of an optimum pH value in step b). Furthermore, the dispersion of the disagglomerated clay particles is improved, whereby a simplified separation of the iron-rich fraction in step d), for example by gravity in the sedimenter, is achieved. By the use of gypsum as the calcium compound, in addition, the adjustment of optimum pH values can be advantageously facilitated in inexpensive manner, since for example less acid has to be added than it would be the case without gypsum addition. Although gypsum ($CaSO_4 \times 2H_2O$) is substantially pH neutral, gypsum can partially dissolve and form calcium and sulfate ions. The sulfate ions bond to corresponding surface areas of the clay particles similarly as hydroxide ions and thus vary the electric surface charge thereof. Hereby, improved dispersion of the clay particles present in the bauxite residue is allowed such that they are retained in the suspension colloidally dissolved. For example, gypsum from flue gas desulfurization plants (REA gypsum) and/or natural gypsum can be used as the gypsum. With the aid of a dispersant, as already mentioned, the particle isolation achieved in step c) can be stabilized or maintained. Thus, once released particles can be prevented from the reagglomeration with undesired other particles and the disagglomeration can be assisted. Therein, basically, sterically and/or electrostatically acting dispersants can be provided. In the steric stabilization, the particle affinic areas of the dispersant are on the mineral particle, while the residuals of the dispersant protrude into the dispersing medium. If two particles encounter each other, they cannot agglomerate because they are kept spaced by the dispersants. In the electrostatic stabilization, the dispersant carries electrical charge. The charge can basically be provided on the particle affinic and/or on the particle-remote end of the dispersant. Hereby, the charged parts of the dispersant form some kind of protective shell around the concerned particles. The electrosteric stabilization combines the mechanisms of the steric and the electrostatic stabilization.

In a further advantageous development of the invention, it is provided that between 0.1% and 10%, in particular between 2% and 6% of calcium compound and/or between 2 and 9 per mille of dispersant are added to the suspension related to the dry matter of the bauxite residue. Hereby, the processability of the bauxite residue, the disagglomeration degree and the yield of iron-rich fraction are advantageously increased. By a mass portion between 0.1% and 10%, in particular mass portions of 0.1%, 0.2%, 0.5%, 1.0%, 1.5%, 2%, 3%, 4%, 5%, 6%, 7%, 8%, 9%, 10% as well as corresponding intermediate values are to be understood. By the addition of the calcium compound, various Ca silicates and Ca aluminates are formed, which allow simpler division or separation of the iron-rich fraction and better filterability of the silicate-rich fraction. While sodium silicates form only at temperatures above 110° C., Ca silicates already form at room temperature and additionally provide for bonding of Na ions in the form of complex Na—Ca silicates. By the addition of one or more calcium compounds, due to the occurring mineral regeneration, the viscosity of the BR suspension can additionally be changed. If gypsum is added as the calcium compound, mass portions between 0.5% and 2% have proven particularly advantageous. If too high amounts of calcium compound are added, undesired adhering effects between the clay particles can occur. By portions between 2‰ and 9‰ of dispersant, in particular portions of 2.0‰, 2.5‰, 3.0‰, 3.5‰, 4.0‰, 4.5‰, 5.0‰, 5.5‰, 6.0‰, 6.5‰, 7.0‰, 7.5‰, 8.0‰, 8.5‰ or 9.0‰ as well as corresponding intermediate values are to be understood. With regard to the dispersant, portions between 3 per mille and 7 per mille usually have proven to be sufficient.

In a further advantageous development of the invention, it is provided that a separating agent, in particular a fluxing agent and/or particles, in particular iron oxide particles, is added to the suspension preferably before and/or during step c). Within the scope of the present invention, compounds are understood by separating agents, which assist the disagglomeration of the mineral agglomerates. Fluxing agents, which can also be referred to as liquefiers, plasticizing agents, super plasticizing agents or super liquefiers, are basically known from the field of concrete production and there serve for improvement of the flowability. The one-time or repeated addition of at least one such fluxing agent to the provided suspension advantageously results in decrease of the surface tension of the suspended mineral particles within the scope of the present invention. Moreover, fluxing agents impede a reagglomeration in particular of the silicate-rich clay platelets in that their numerous side chains such as for example in PCE (polycarboxylate ester) construct steric hindrances. Thereby, fluxing agents assist the disagglomeration and the following separation into an iron-rich and at least one further fraction by maintenance of the particle separation. This allows significant increase of the iron yield.

For the industrial employment, it is of particular interest that already low amounts of the fluxing agent result in considerable improvements of the disagglomeration, whereby the economy of the process is advantageously improved. For example, melamine sulfonate and/or melamine sulfonate derivatives can be used as the fluxing agent. By these compounds, in addition, the surface tension of the present water is decreased and a lubricating effect is effected, whereby the disagglomeration is also facilitated. Alternatively or additionally, basically, lignin sulfonates, naphthalene formaldehyde sulfonates, polycarboxylates, polycarboxylate esters (PCE) and/or hydroxy carboxylic acids and the salts thereof can also be used as the fluxing agents. In PCE, the numerous side chains are in particular of importance since they constitute a particularly high steric hindrance for the undesired reagglomeration of already separated particles in the suspension.

Alternatively or additionally, particles, in particular iron oxide particles, can specifically be added to the suspension. The added particles act as small "projectiles" due to their weight and their shape, which promote the disintegration of the agglomerates by collisions with agglomerates in the suspension in the disagglomeration. In particular in using iron oxide particles, the added particles additionally also function as seed crystals or crystal nuclei, which "collect" and bind the disagglomerated iron particles, whereby the iron yield is also advantageously increased. Therein, it can be provided that iron particles are used as the particles, which were already separated with the aid of the process according to the invention and are recycled into the process. Hereby, the process can be particularly economically performed with particularly high iron yields.

In a further advantageous development of the invention, it is provided that at least one fluxing agent is added to the suspension with a weight portion between 0.01% and 1.0%, in particular between 0.4% and 0.6% related to the dry matter of the bauxite residue. By a weight portion of the fluxing agent between 0.01% and 1.0%, in particular weight portions of 0.01%, 0.10%, 0.15%, 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95% and 1.0% as well as corresponding intermediate values are to be understood. Hereby, the process can be particularly economically performed also within the industrial scope since the specified, relatively low fluxing agent amounts already result in considerable improvements of the disagglomeration and thereby reduce the time required for performing the process and allow improved yield.

In further development of the invention it is provided that particles are added, which have at least predominantly an average diameter between 0.3 µm and 25 µm, in particular between 0.4 µm and 20 µm. By particles having at least predominantly an average diameter between 0.3 µm and 25 µm, within the scope of the invention, particles are understood, of which at least 51% have an average diameter of 0.3 µm, 0.4 µm, 0.5 µm, 0.6 µm, 0.7 µm, 0.8 µm, 0.9 µm, 1.0 µm, 1.0 µm, 1.5 µm, 2.0 µm, 2.5 µm, 3.0 µm, 3.5 µm, 4.0 µm, 4.5 µm, 5.0 µm, 5.5 µm, 6.0 µm, 6.5 µm, 7.0 µm, 7.5 µm, 8.0 µm, 8.5 µm, 9.0 µm, 9.5 µm, 10.0 µm, 10.5 µm, 11.0 µm, 11.5 µm, 12.0 µm, 12.5 µm, 13.0 µm, 13.5 µm, 14.0 µm, 14.5 µm, 15.0 µm, 15.5 µm, 16.0 µm, 16.5 µm, 17.0 µm, 17.5 µm, 18.0 µm, 18.5 µm, 19.0 µm, 19.5 µm, 20.0 µm, 20.5 µm, 21.0 µm, 21.5 µm, 22.0 µm, 22.5 µm, 23.0 µm, 23.5 µm, 24.0 µm, 24.5 µm, 25.0 µm or corresponding intermediate values. By the added particles being at least predominantly in the specified grain size range, they act particularly effectively as small projectiles due to their weight and their basically rather round shapes, which are brought to a high speed for example by a dissolver stirrer and assist the disagglomeration by collisions with agglomerates. At the same time, they serve as seed crystals/nuclei, collect and bind iron particles present in the suspension. This is a time-dependent procedure. Similar effects can also be achieved by the employment of ultrasound and/or other disagglomeration means instead of a dissolver stirrer.

In further advantageous development of the invention, the cavitation or the cavitation forces required for disagglomeration are generated by at least one moved object, in particular by a dissolver stirrer, a shear stirrer, an impeller of a rotary pump, an impeller of a turbine, a shaker and/or a propeller. In further development of the invention the cavitation is generated and/or by application of ultrasound to the suspension. Therein, the technically simplest possibility for cavitation is in the use of an object fast moved in the suspension. According to the Bernoullis's law, the static pressure of a liquid is the lower, the higher the speed is. If the static pressure drops below the evaporation pressure of the liquid, steam bubbles form. They are subsequently entrained into areas of higher pressure with the flowing liquid. With the new increase of the static pressure above the evaporation pressure, the steam in the cavities abruptly condenses. Therein, extreme pressure and temperature peaks occur. Local pressure changes can therefore be particularly simply generated with the aid of rotor blades, impellers, dissolver stirrers, shear stirrers, pumps, shakers and the like. Alternatively or additionally, cavitation can also be generated by application of ultrasound to the suspension. Therein, cavitation occurs in the pressure minimums of the oscillation. A further advantage of the use of ultrasound is in the comparatively high temperature input into the suspension such that temperature adjustment can be performed at the same time.

By the object for generating the cavitation being moved with a rotary frequency of at least 1000 $min^{-1}$, in particular of at least 2000 $min^{-1}$, through the suspension, a significant increase of the shear forces in the suspension can be advantageously achieved. For example, to this, particularly powerful dissolver stirrers can be used, which are able to achieve revolution speeds up to 3000 rmin or more. The use of fast rotating stirrers results in increased cavitation and as a result in particularly fast and complete crushing and dispersing of the mineral particle complexes.

In further development of the invention, a technically particularly simple, fast and inexpensive possibility of separating the iron-rich fraction is achieved in that the further fraction (clay fraction) is separated from the iron-rich fraction by sucking and/or decanting and/or filtering, in particular by vacuum filtering. Due to the good separation of the two fractions, therein, additional adjuvants such as flocculants or the like are basically not required.

Further advantages arise in that the iron-rich fraction is washed and/or dried after separation. This allows simplified further processing such as for example smelting and crude iron extraction of the iron-rich fraction.

In a further advantageous development of the invention, it is provided that at least one calcium compound, in particular calcium oxide and/or calcium hydroxide and/or calcium sulfate, is added to the further fraction after separation. Hereby, the filterability and thereby the separability of the silicate-rich fraction is improved on the one hand, on the other hand, one obtains hereby a kind of clay, which is particularly well suitable as a soil conditioner. In particular by the addition of calcium sulfate, a product is obtained, which allows greening of BR disposal sites and the like due to the bioavailability of the sulfate ions. Moreover, Na ions present in the further fraction are bonded in the form of Na—Ca silicates such that environmental hazard by exiting or eluted caustic soda lye does no longer exist in contrast to the bauxite residue.

In a further advantageous development of the invention, it is provided that between 2% and 15%, in particular between 5% and 10% of calcium compound is added to the further fraction related to its dry matter. By mass portions between 2% and 15%, within the scope of the invention, mass portions of 2%, 3%, 4%, 5%, 6%, 7%, 8%, 9%, 10%, 11%, 12%, 13%, 14% or 15% as well as corresponding intermediate values are to be understood. Hereby, the characteristics of the further fraction can be optimally adapted to its respective purpose of employment, for example as an additive to sand, acidic earth, lime, gypsum, fertilizer or as a filter medium or soil conditioner.

In a further advantageous development of the invention, it is provided that the temperature of the further fraction is adjusted to a value between 30° C. and 70° C. after separation. By a temperature between 30° C. and 70° C., within the scope of the invention, temperatures of 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C. or 70° C. as well as corresponding intermediate temperatures are to be understood. Hereby, the mineral regeneration can be accelerated and specifically controlled. By the formation of different hydrate compounds, in addition, the present residual water is at least partially bound, whereby a readily breakable material is obtained. Above about 70° C., severely different hydrate compounds form, which rather impede the further processing.

A further aspect of the invention relates to an apparatus for performing a process according to any one of the preceding embodiments. In order to allow a wet-chemical separation of at least a part of the iron containing components in the bauxite residue as materials of value, the apparatus according to the invention includes at least one container for receiving the aqueous suspension of the bauxite residue, a device for adjusting the pH value of the aqueous suspension, a device for at least partially disagglomerating suspended mineral agglomerates of the bauxite residue and a device for separating the resulting mixture into an iron-rich fraction and at least one further fraction. The advantages arising herefrom can be taken from the preceding descriptions of the process according to the invention and correspondingly apply to the apparatus according to the invention. Advantageous developments of the process are additionally to be considered as advantageous developments of the apparatus and vice versa.

The iron-rich fraction obtained by means of process according to any one of the preceding embodiments and/or by means of an apparatus according to the preceding embodiment for obtaining iron. Hereby, a simple, scalable and wet-chemically practicable extraction of iron from the bauxite residue considered as waste heretofore with corresponding environmental and cost advantages is constituted.

The further fraction obtained by means of a process according to any one of the preceding embodiments and/or by means of an apparatus according to the preceding embodiment as a filter body, in particular for heavy metals, for desulfurization and/or removal of arsenic, for water purification and/or exhaust gas purification as a pyrolysis catalyst, in particular in a biomass reactor as a soil conditioner and/or as an admixture to sand, acidic earth, lime, gypsum, cement, concrete and/or plant fertilizer. By these uses the further fraction can be advantageously used as a further material of value besides the iron-fraction, whereby further environmental and cost advantages are constituted.

Further features of the invention are apparent from the claims, the embodiments and the drawing. The features and feature combinations mentioned above in the description as well as the features and feature combinations mentioned below in the embodiments are usable not only in the respectively specified combination, but also in other combinations without departing from the scope of the invention. Therein, FIG. 1 shows a schematic diagram of an apparatus according to the invention for performing the process according to the invention for obtaining a material of value from a bauxite residue.

EXAMPLE 1

FIG. 1 shows a schematic diagram of an apparatus 10 according to the invention for performing the process according to the invention for obtaining material of value from a bauxite residue. Therein, the apparatus 10 shown in FIG. 1 is basically also suitable for performing all of the following examples.

The apparatus 10 includes a basically optional transfer point 12, in which bauxite residue (BR), which is for example immediately passed from the Bayer process and/or originates from old landfills, is transferred with the aid of a transport device 13 for obtaining material of value. The BR can be freed from aluminate solution, excess water or the like in the transfer point 12 by means of an also optional vacuum filter drum 14 or another suitable separating device. Subsequently, the BR is transferred into an also basically optional stirring container 16, in which a bauxite residue suspension is produced with the aid of a stirrer 17. Herein, as needed, a corresponding amount of water can be added from the water container 18 to adjust a desired viscosity, a desired dry matter portion and/or a desired initial pH value. From the stirring container 16, the aqueous suspension is pumped into a disagglomerator 20, which is equipped with a dissolver stirrer 22 and/or an ultrasonic device (not shown) and/or another suitable device for generating cavitation. The disagglomerator 20, which serves as a device for at least partially disagglomerating suspended mineral agglomerates of the bauxite residue in the shown embodiment, can have a single-walled or multi-walled container. Multi-walled containers in particular offer the advantage of improved capability of tempering and improved thermal insulation. Furthermore, the stirring container 16 can basically also be omitted and the suspension to be disagglomerated can be directly produced in the disagglomerator 20.

From a container 24, separating chemicals can be added to the suspension. The separating chemicals can for example be acids for adjusting the pH value of the suspension and/or fluxing agents such as polycarboxylate ester (PCE), melamine sulfonate or similar. The use of separating agents results in decrease of the surface tension of the mineral particles and assists the dissolution of the complex bond. The container 24 therefore also serves as a device for adjusting the pH value of the aqueous suspension in the present embodiment. Particularly the numerous side chains are of importance in PCE since they constitute a steric hindrance for the congregation and binding of particles in the suspension to each other. In other words, they maintain the spatial separation of the particles. For the industrial, economical employment, it is interesting that already low amounts of the fluxing agent (e.g. 0.4% to 0.6% of the solid matter) result in considerable improvements of the disagglomeration because they prevent new binding in particular of clay platelets to each other.

Furthermore, the separating chemicals can include particles. For example, iron oxide particles already obtained with the aid of the process can be added to the suspension to increase the iron oxide yield. The iron oxide particles preferably have a grain size range between 0.4 µm and 20 µm and act as small projectiles due to their weight and their rounded shape (small platelets like the clay particles), which are accelerated to high speed by the dissolver stirrer 22 and additionally disintegrate the agglomerates by collisions with agglomerates in the suspension. At the same time, they serve as seed crystals or seed nuclei and collect and bind smaller iron particles located in the suspension. This is a time-dependent procedure. Similar effects can also be achieved by the employment of ultrasound or other disagglomeration devices instead of the dissolver stirrer 22.

As a further separating chemical, a calcium compound such as for example burnt lime, slaked lime or gypsum ($CaSO_4 \times 2H_2O$) can be added to the suspension. Therein, gypsum can in particular considerably decrease the required amount of acid addition, in particular of the very effective and environmentally friendly citric acid, whereby corresponding cost reductions are constituted. Although gypsum itself is substantially pH neutral, gypsum can partially dissolve with formation of Ca and sulfate ions. The sulfate ions bind to the same surface locations of the clay particles as for example the OH groups of the citric acid and thus change the electric surface charge thereof in similar manner. Thereby, the sulfate ions help in the dispersion of the clay particles in order that they are present colloidally dissolved or suspended. At the same time, released Ca ions, by incorporation in zeolites, which have substantially been formed as sodium aluminum silicates during the bauxite extraction, reduce the ion exchange capabilities thereof and thereby improve the adjustability of the optimum pH value for the dispersion of the mineral components of the BR suspension. This improves the following separation of the resulting mixture by gravity in the downstream sedimenter 26. The sedimenter 26 thus serves as a device for separating the resulting mixture into an iron-rich fraction and at least one further fraction lower in iron in the shown embodiment. A gypsum addition can for example be effected in the form of REA gypsum of natural gypsum. The amount is optimally at 0.5-2% and usually should not exceed 4% of the dry matter of the suspension since otherwise adhering effects between the clay particles can occur.

The separating chemicals can basically be added before and/or during and/or after the disagglomeration individually and/or in any combinations. Therein, the separating chemicals can basically be kept available in a common compartment of the container 24. However, the container 24 can basically also have multiple separate compartments or multiple individual containers, in which varietal separating chemicals are each kept available and are added in the desired amount and order.

The dissolver stirrer 22 is preferably equipped with a fast rotating stirrer (up to 3000 rmin or more) to allow a cavitation as large as possible and in the consequence a particularly effective rupture and dispersion of the mineral particle complexes as a preparation to the sedimentation. This conversion procedure is additionally improved by the specific adjustment of the pH value by corresponding addition of separating chemicals (e.g. of acids such as citric acid, sulfuric acid etc.). The disagglomeration as well as the reagglomeration of the mineral particles constitute time-dependent procedures, which depend on various factors. After the partial or at least approximately complete disagglomeration of the mineral agglomerates, the resulting mixture is pumped into the sedimenter 26. Here, the mixture separates with time into a silicate-rich, orange-colored floating phase and an iron-rich fraction sinking to the bottom with brownish color. The bottom phase is washed in a basically optional washer 28 and optionally at least partially dried. By washing the separated iron ore 30, the clay portion thereof can again be decreased. However, a possibly left clay portion can also be used as a binder for the production of iron ore pellets on the other hand. The drying is preferably effected with the aid of waste heat of the process. One obtains high-grade iron ore 30 with an iron content of at least 40%, normally of above 50% as the product, which can be directly used without further treatment steps for iron or steel production.

The silicate-rich floating phase can directly be used after separation or optionally be transferred into a further stirring container 32 with a stirrer 33. Here, the floating phase can be mixed with a calcium compound, for example with burnt lime, white lime, gypsum and/or slaked lime, with stirring and optionally be heated to a temperature between 20° C. and 65° C., thus for example to a temperature of 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C. or 65° C. The calcium compound can for example be stored in the container 34 and added via a rotary valve.

Herein, clay formation occurs by the minerals contained in the floating phase reacting with calcium with mineral regeneration to a swelling clay-like calcium aluminate clay mud (CATO, 38). As the ingredients of the CATO 38, predominantly calcium and sodium aluminates formed from the aluminum compounds contained in the BR as well as optionally goethite formed from possible iron oxides and hydroxides left in the floating phase. Therein, the proceeding main reactions are the formation of tricalcium aluminate

$$3Ca(OH)_2 + 2Al_2O_3 + 3H_2O \rightarrow Ca_3Al_2[(OH)_4]_3$$

as well as optionally the conversion from hematite into goethite:

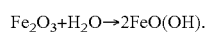
$$Fe_2O_3 + H_2O \rightarrow 2FeO(OH).$$

The formed CATO 38 can be dehydrated via a chamber filter press 36 or another dehydration device. The separated filtrate 40 can be returned to the disintegrator or stirring container 16, whereby considerable amounts of fresh water are saved and the required liquid can be at least predominantly circulated.

The obtained product mixture, that is the CATO 38, possesses a particularly large reactive surface and is suitable for various applications. For example, the CATO 38 can be dried and/or used as a filter element, in particular for filtering plant oil and/or contaminated water and/or as a soil conditioner and/or as a purification agent and/or as a cement additive and/or as a building material and/or as a mineral fertilizer. With the aid of the CATO 38, for example, crude plant oil from pressing oil plants can be refined and freed from undesired organic components. Due to its high specific surface, the CATO 38 is also suitable for filtering contaminated water, wherein in particular acidic waters can be neutralized at the same time via its residual alkali content.

Alternatively or additionally, the CATO 38 can variously be used as a soil conditioner, purification agent, cement additive, building material and/or mineral fertilizer. Therein, it can be provided that the CATO 38 is mixed with charcoal dust, whereby a black earth-like (terra preta) mixture is obtainable, which constitutes a very fertile soil matching good European soil. In this manner, with the aid of the bauxite residue considered as waste heretofore, sustainable agriculture in the rain tillage farming zone and in other climate zones can be promoted.

Furthermore, the CATO 38 can be mixed with biomass, in particular with wood, chips, bark, straw, bagasse, leaf mass, plant waste, grass, foliages, dung, plant oil, sewage sludge, liquid manure, organic domestic waste and/or sawdust, and subjected to biomass gasification, whereby further materials of value are obtainable. Therein, the biomass gasification, which is preferably performed under oxygen exclusion, proceeds already at low temperatures between 250° C. and 450° C., in particular between 280° C. and 400° C. due to the characteristics of the CATO. Moreover, the biomass gasification proceeds free of tar and without appreciable carboxylic acid formation (in particular without acetic acid or formic acid formation) due to the catalytic characteristics of the CATO 38.

For mixing the CATO 38, the apparatus 10 has a basically optional mixer 42. The compounds to be admixed, for example sand, lime, gypsum, charcoal, biomass etc., can be kept available in the container 44 and correspondingly added. According to the admixed further compounds, one thus obtains different further products 46 besides the iron ore 30, which in turn constitute valuable materials of value.

EXAMPLE 2

As the starting material, bauxite residue from the Bayer process is used, which was multiple times washed and separated from the aluminate solution via the vacuum filter drum 14. The bauxite residue has a water content of about 35% $H_2O$. In the stirring container 16, by addition of corresponding amounts of water, 2 liters of a bauxite residue suspension are produced, wherein the suspension has 1 kg of dry matter and a pH value of 13. With continuous stirring with the aid of a shear stirrer, the suspension is brought to a temperature of about 52° C. Therein, the use of a shear stirrer advantageously allows the generation of high shear forces by the formation of overlapping layers. Hereby, the viscosity of the suspension advantageously decreases since the platelet-shaped silicate particles of the bauxite residue align substantially parallel to the layers and form new collective properties. The thixotropic suspension therefore becomes increasingly lower in viscosity with increasing stirring period until reaching a viscosity minimum. After completion of the shear load, the viscosity again increases by the stochastic rearrangement of the silicate particles depending on time. 1 liter of acidic, oil containing condensate water from a biomass reactor is added to the suspension. The suspension is homogenized for ca. 30 minutes with stirring. The biomass reactor is a reactor, in which chips are pyrolyzed employing the clay product (CATO 38) from the process according to the invention described in more detail in the following. The bio oil from the acidic condensate reacts with saponification, which is recognizable by foam formation. Therein, the pH value of the suspension decreases to about 8.4.

Thereafter, the suspension is transferred into a container optimized in size, for example the disagglomerator 22, which is provided with a 200 mm dissolver stirrer. With the aid of the dissolver stirrer, the suspended mineral agglomerates of the bauxite residue are at least partially disagglomerated. After ca. 20 minutes of stirring time, the disagglomeration is terminated. After a settling time of ca. 5-30 minutes, a heavy phase of iron oxides has settled, above which a simply decantable, silicate-rich floating phase is located. After extraction of the floating phase in a vacuum filter unit, this further fraction is transferred to another stirring vessel for further reconditioning. The separated iron ore phase is one or more times washed with water and filtered off, whereby it has a residual water content of about 30%. The iron ore yield is 0.382 kg corresponding to 38% of the employed dry matter. The Fe content is at about 55% according to X-ray fluorescence analysis (RFA measurement), while Ti is at about 5% and Na is at about 0.5%. It is to be emphasized that the sodium is not present free and thereby elutable, but bound in silicates.

From the floating phase, one obtains a kind of clay after filtering off the water, since now the silicate minerals considerably predominate. Due to the reduction of iron minerals, the color has changed from red to yellow-brown to yellow-orange. Upon cooling, new hydrates form such that a partial bond of the residual water in the newly formed minerals occurs. This crystal water can only again be expelled at temperatures above 130° C. The silicate-rich fraction can be easily broken to mix it with other materials such as for example sand, acidic earth, lime, gypsum or fertilizer and for example produce a soil conditioner. In contrast to the original bauxite residue, environmental hazard by elutable caustic soda lye does no longer exist. The silicate-rich fraction has a nature-compatible pH value and can also be used as an additive for concrete, ceramic and the like.

EXAMPLE 3

As the starting material, bauxite residue from the Bayer process is again used, which was multiple times washed and separated from the aluminate solution via a vacuum filter drum (e.g. vacuum filter drum 14) for caustic soda lye recovery. The bauxite residue, which still has a temperature of about 70° C. after washing, again has a water content of about 35% $H_2O$. In a stirring container (e.g. stirring container 16), by addition of corresponding amounts of water, 2.9 liters of a bauxite residue suspension with a pH value of 12-13 are produced, wherein the suspension has a solid content of 1 kg. With continuous stirring with the aid of a disintegrating shear stirrer, the temperature is brought to about 56° C. 25 ml of plant oil (e.g. crude rape oil) are added to the suspension. The suspension is homogenized for 30 minutes with stirring. By the hydrolysis of the plant oil, the pH value of the suspension decreases to ca. 12.0. Subsequently, 100 ml of acetic acid, which was obtained by 1:10 dilution from glacial acetic acid (96% HOAc), are added, whereby the pH value of the suspension decreases to 7.9.

Thereafter, the suspension is transferred into a container optimized in size (e.g. disagglomerator 20), which is equipped with a 100 mm dissolver stirrer, and disagglomerated by generation of cavitation. After ca. 20 minutes of stirring time, the disagglomeration is terminated. After a settling time of ca. 5-30 minutes, a heavy phase of iron oxides has settled, above which a properly decantable floating phase is located. After extraction of the floating phase, the iron ore phase is washed with rinse water and the water is filtered off. The iron-rich fraction has a residual water content of about 30%. The iron ore yield is 0.279 kg corresponding to 28% of the originally employed dry matter.

The Fe content is at 55% according to RFA measurement, while Ti is at about 5% and Na is at about 0.5%. Again, the fraction does not have free, elutable sodium ions since the overall sodium content is present bound in silicates.

After filtering off the water, the floating phase constitutes a kind of clay since the silicate minerals are severely enriched with respect to the iron compounds compared to the original bauxite residue. Due to the enrichment of iron minerals, the color has changed from red to bright orange. The filterability of the silicate-rich fraction can advantageously be improved if 5-10% by weight of burnt lime are added to the silicate-rich fraction and the arisen mixture is brought to temperatures between about 43 and 49° C. Upon cooling the reaction mixture, new hydrates form such that mineral binding of the residual water occurs. This can only be again expelled at temperatures beyond 130° C. The material can be easily broken to mix it with other materials, e.g. with sand, acidic earth, lime, gypsum or fertilizer to produce a soil conditioner. The silicate-rich fraction can also be used as an additive for concrete, ceramic and the like. In contrast to the original bauxite residue, here too, environmental hazard by elutable caustic soda lye does no longer exist.

EXAMPLE 4

As the starting material, bauxite residue from the Bayer process is again used, which was multiple times washed and separated from the aluminate solution via a vacuum filter drum (e.g. vacuum filter drum 14) for caustic soda lye recovery. The bauxite residue again has a water content of about 35% $H_2O$. In a stirring container (e.g. stirring container 16), 2.9 liters of bauxite residue suspension containing 1 kg of dry matter with a pH value of about 13 are brought to a temperature of 60° C. with continuous stirring (shear stirrer). 25 ml of plant oil (crude rape oil) are added to the suspension. Subsequently, the suspension is homogenized for about 30 minutes, wherein the plant oil is hydrolyzed in alkaline manner. The pH value of the suspension decreases to ca. 12.0. Subsequently ca. 100 ml of 0.5% sulfuric acid are added until a pH value of about 9.1 appears.

Thereafter, the suspension is transferred to a geometrically optimized container (e.g. disagglomerator 20), which is equipped with a 100 mm dissolver stirrer. With the aid of the dissolver stirrer, which is operated with rotating speeds between about 2500 rmin and 3000 rmin, cavitation forces are generated in the suspension such that water molecules are "shot" between the agglomerated particles of the bauxite residue. Hereby, the particles are disagglomerated in cooperation with the adjusted pH value. After ca. 20 minutes of stirring time, the disagglomeration is terminated. After a settling time of ca. 5-30 minutes, an iron-rich fraction has settled, above which a properly decantable floating phase is located.

After decanting the floating phase into a new stirring container (e.g. stirring container 32), the iron-rich phase is washed with rinse water and the water is filtered off (residual water 30%). The iron ore yield is 0.382 kg corresponding to 38% of dry matter. The Fe content is at 55% according to RFA measurement. The contents of titanium are at 5%, while the contents of sodium are at ca. 0.5%. Here too, free Na ions are not present since the sodium portion is bound in silicates. The floating phase is brought to a temperature of 45-49° C. in the further stirring container. Subsequently, the silicate-rich fraction is mixed with 3-10% of burnt lime related to 60% of the dry matter and reacted for about 90 minutes with homogenization. The developed mixture is dehydrated via a vacuum filter unit, wherein the filtering is possible substantially faster than without CaO addition. A weak alkaline solution with a pH value between about 12.4 and 12.6 and a porous clay with pore sizes below 1 mm arises, which is suitable as a filtering or absorption medium, e.g. for heavy metal and arsenic binding in the drinking water treatment. Here too, danger by releasable caustic soda lye does not exist anymore. The pH value of the clay-like product changes fast by aging to an unproblematic value of about 9. The silicate-rich product is also suitable as an additive for concrete, ceramic and the like.

EXAMPLE 5

As the starting material, bauxite residue from the Bayer process is used, which was once washed and separated from the aluminate solution via a vacuum filter drum (e.g. vacuum filter drum 14) for caustic soda lye recovery. In a stirring container (e.g. stirring container 16), 2.6 liters of a bauxite residue suspension with a content of 1 kg of dry matter and a pH value of 13 are produced and brought to a temperature of 63° C. with continuous stirring (dissolver stirrer with medium speed). 25 ml of plant oil (crude rape oil) are added to the suspension. Subsequently, the mixture is reacted for 10 minutes with homogenization. The pH value decreases during this time to ca. 12.0. Subsequently, 10 g of citric acid dissolved in 200 ml of water, is added in steps of each 50 ml. Hereby, the pH value of the suspension decreases stepwise over ca. 9.2 to ca. 7.4. After each addition of the citric acid solution, the suspension is stirred for 10 minutes with highest stirring speed. In this manner, the yield of iron or iron compounds can be advantageously increased since hereby the isoelectric points of different iron compounds are stepwise "passed", wherefrom an improved disagglomeration results. Moreover, the citric acid functions not only as an inexpensive and simply manageable acid for adjusting the pH value, but it also prevents the reagglomeration of iron-rich and silicate-rich particles as a kind of "grain refiner". Instead, the disagglomerated particles are highly efficiently separated and distributed in the suspension. After ca. 40 minutes in total, a heavy phase of iron oxides settles, above which a simply decantable floating phase is located.

After extraction of the floating phase, the iron ore phase is washed with rinse water and the water is filtered off (residual water 30%). The iron ore yield is 0.428 kg corresponding to 42% of dry matter. The Fe content is at ca. 55% according to RFA measurement, while Ti is at 5% and Na is at 0.5%. Again, free sodium is not found since it is present bound in silicates.

After filtering off the water (foam formation lower than in example 1), the floating phase presents itself as a kind of clay since the silicate minerals now considerably predominate with respect to the iron oxides. Accordingly, the color has changed from red to orange. The filtering becomes much more favorable if 5-10% by weight of burnt lime are added before and the mixture reacts at temperatures of 42-49° C. Hereby, new hydrates form such that a mineral binding of the residual water occurs. This crystal water can only be again expelled at temperatures beyond 130° C. The developed material can be easily broken to mix it with other materials, e.g. with sand, acidic earth, lime, gypsum or fertilizer to produce a soil conditioner. A use as an additive for concrete, ceramic and the like is also possible. Here too, environmental hazard by releasable caustic soda lye does no longer exist.

EXAMPLE 6

As the starting material, bauxite residue from the Bayer process is again used, which was once washed and separated from the aluminate solution via a vacuum filter drum (e.g. vacuum filter drum 14) for caustic soda lye recovery. In a stirring container (e.g. disagglomerator 20), the geometry of which is adapted to the diameter of a used dissolver stirrer, 2.6 liters of bauxite residue suspension containing 1 kg of dry matter and having a pH value of 13 are brought to a temperature of 63° C. with continuous stirring (dissolver stirrer with medium speed). An optimum solid/water ratio is regularly at about 1:2 to 1:5. 5% of CaO related to the bauxite residue dry matter are added to the suspension and reacted for 40 minutes with homogenization. Therein, exchange of Na ions for Ca ions occurs in the zeolite-like silicate compounds of the bauxite residue such that the ion exchange capability and thus the buffer action of these compounds is severely reduced. The pH value of the suspension decreases to ca. 12.4 to 12.6. Subsequently, 10 g of citric acid dissolved in 200 ml water are added in steps of each 50 ml. Therein, the pH value of the suspension gradually decreases over ca. 9.2 to 7.4. After each step, it is stirred with highest stirring speed for 10 minutes to achieve disagglomeration of the iron-rich and the silicate-rich particles. Before, during and/or after the addition of the citric acid solution, one or more dispersants, surfactants and the like with a concentration in the range of 0.2 per mille can basically be added to achieve an additionally improved particle separation. Alternatively or additionally to a dissolver stirrer or the like, the cavitation forces can also be generated with the aid of ultrasound. To this, the stirring container is for example provided with a sonotrode or another suitable device for generating ultrasound.

After about 40 minutes, a heavy phase of iron oxides has settled, above which a properly decantable floating phase is located. After extraction of the floating phase, the iron ore phase is washed with rinse water and the water is filtered off (residual water content 30%). The iron ore yield is 0.457 kg corresponding to almost 46% of the dry matter. The Fe content is at ca. 55% according to RFA measurement, for Ti at 5% and for Na at 0.5%. Again, free sodium is not found since it is present bound in silicates.

The floating phase presents itself as a kind of clay after filtering off the water (foam formation lower than in example 1), in which the silicate minerals now considerably predominate with respect to the iron compounds. The filtering becomes much more favorable if 5-10% of burnt lime is added to the silicate-rich fraction and the silicate-rich fraction is heated to temperatures between 43 and 49° C. Herein, new hydrates form, whereby a mineral binding of the residual water is effected. This residual water can only be again expelled at temperatures beyond 130° C. The developed material can be easily broken to mix it with other materials, e.g. with sand, acidic earth, lime, gypsum or fertilizer to produce a soil conditioner. A use as an additive for concrete, ceramic and the like is also possible. Here too, environmental hazard by releasable caustic soda lye does no longer exist. The porous clay can also be employed as a filter mass for exhaust gas purification, biogas purification, desulfurization and the like. Furthermore, the silicate-rich fraction is suitable as a filter medium for immobilization of heavy metals and in particular of arsenic. Moreover, the separated floating phase (clay) can be used as a catalyst mass in a biomass reactor, wherein it suppresses formation of tar and advantageously increases the hydrogen yield in the low-temperature pyrolysis in the temperature range between 230° C. and 550° C.

The parameter values specified in the documents for defining process and measurement conditions for the characterization of specific properties of the inventive subject matter are to be considered as encompassed by the scope of the invention even within the scope of deviations—for example due to measurement errors, system errors, weighing errors, DIN tolerances and the like.

The invention claimed is:
1. Process for obtaining material of value from a bauxite residue, which is obtained by the Bayer process, including the steps of:
   a) providing an aqueous suspension of the bauxite residue, wherein said aqueous suspension has a pH value between 12 and 14;
   b) adjusting pH of the suspension to a value between 7.2 and 12.2;
   c) at least partially disagglomerating suspended mineral agglomerates of the bauxite residue, wherein the suspended mineral agglomerates are disagglomerated by generation of cavitation; and
   d) separating a resulting mixture of the disagglomerated suspended mineral agglomerates into an iron-rich fraction and into at least one further fraction.
2. Process according to claim 1, wherein in step a) a ratio of solid to liquid between 1:2 and 1:5 is adjusted in the suspension and/or that in step a) a bauxite residue with a water content between 20% and 40% by mass based on the mass of the bauxite residue is used.
3. Process according to claim 1 wherein density of the suspension is adjusted to a value between 1.05 g/cm$^3$ and 1.35 g/cm$^3$.
4. Process according to claim 1, wherein the temperature of the suspension is adjusted to a value between 30° C. and 70° C. before step c).
5. Process according to claim 1, wherein the pH value is adjusted to a value between 7.4 and 11.8 in step b).
6. Process according to claim 1, wherein the pH value adjusted in step b) is continuously and/or gradually varied in the range between 7.2 and 12.2 during step c).
7. Process according to claim 1, wherein the pH value is adjusted by addition of an acid.
8. Process according to claim 1, wherein the pH value is adjusted by addition of a base.
9. Process according to claim 1, wherein the pH value is adjusted by addition of a hydrolyzable compound.
10. Process according to claim 1, wherein at least one calcium compound, and/or at least one dispersant is added to the suspension before step c).
11. Process according to claim 10, wherein between 0.1% and 10% by mass based on the mass of the dry bauxite residue of calcium compound and/or between 2 and 9 per mille of dispersant are added to the suspension related to the dry matter of the bauxite residue.
12. Process according to claim 1, wherein at least one separating agent is added to the suspension.
13. Process according to claim 12, wherein the at least one separating agent is a fluxing agent, the fluxing agent is added to the suspension with a weight portion between 0.01% and 1.0% based on the weight of the dry bauxite residue.
14. Process according to claim 12, wherein particles are added to the suspension, the particles at least predominantly have an average diameter between 0.3 µm and 25 µm.
15. Process according to claim 1, wherein the cavitation is generated by at least one moved object.
16. Process according to claim 1, wherein the cavitation is generated by applying ultrasound to the suspension.
17. Process according to claim 15, wherein the object for generating the cavitation is moved with a rotational frequency of at least 1000 min$^{-1}$ through the suspension.
18. Process according to claim 1, wherein the further fraction is separated from the iron-rich fraction by vacuum filtration and/or decanting and/or filtering.
19. Process according to claim 1, wherein the iron-rich fraction is washed and/or dried after separation.
20. Process according to claim 1, wherein at least one calcium compound is added to the further fraction after separation.
21. Process according to claim 20, wherein between 2% and 15% by mass of the calcium compound is added to the further fraction based on the mass of the dry further fraction.
22. Process according to claim 1, wherein the temperature of the further fraction is adjusted to a value between 30° C. and 70° C. after separation.

* * * * *